United States Patent
Yang

(10) Patent No.: US 10,102,397 B2
(45) Date of Patent: Oct. 16, 2018

(54) INFORMATION TRANSMITTING METHOD AND DEVICE AND INFORMATION RECEIVING METHOD AND DEVICE

(71) Applicant: Yulong Computer Telecommunication Scientific (Shenzhen) Co., Ltd., Shenzhen, Guangdong (CN)

(72) Inventor: Fan Yang, Guangdong (CN)

(73) Assignee: Yulong Computer Telecommunication Scientific (Shenzhen) Co., Ltd, Shenzhen, Guangdong (CN)

( * ) Notice: Subject to any disclaimer, the term of this patent is extended or adjusted under 35 U.S.C. 154(b) by 168 days.

(21) Appl. No.: 15/251,315

(22) Filed: Aug. 30, 2016

(65) Prior Publication Data
US 2016/0371506 A1    Dec. 22, 2016

Related U.S. Application Data

(63) Continuation-in-part of application No. PCT/CN2014/074227, filed on Mar. 27, 2014.

(51) Int. Cl.
*G06F 21/62* (2013.01)
*H04L 29/06* (2006.01)
(Continued)

(52) U.S. Cl.
CPC .......... *G06F 21/6245* (2013.01); *H04L 51/04* (2013.01); *H04L 51/18* (2013.01);
(Continued)

(58) Field of Classification Search
CPC .............. H04W 4/14; G06F 17/30038; G06F 21/6245; H04L 67/1097; H04L 67/1095;
(Continued)

(56) References Cited

U.S. PATENT DOCUMENTS

| | | | | |
|---|---|---|---|---|
| 2010/0153578 A1* | 6/2010 | Van Gassel | ........... | H04L 65/607 709/231 |
| 2010/0304766 A1* | 12/2010 | Goyal | ................. | H04L 12/5885 455/466 |

FOREIGN PATENT DOCUMENTS

| CN | 101106742 A | 1/2008 |
|---|---|---|
| CN | 101351006 A | 1/2009 |

* cited by examiner

*Primary Examiner* — Kambiz Zand
*Assistant Examiner* — Aubrey H Wyszynski
(74) *Attorney, Agent, or Firm* — Young Basile Hanlon & MacFarlane, P.C.

(57) ABSTRACT

Provided in the present disclosure are an information transmitting method, an information receiving method, an information transmitting device, and an information receiving device. The information transmitting method comprises: selecting a target transmission mode from transmission modes for a to-be-transmitted short message in response to receiving a selection command; when the target transmission mode is a disappear-after-reading transmission mode, prompting a user whether or not to back up the to-be-transmitted short message to a server; and, when a command for backing up the to-be-transmitted short message to the server is received, adding a backup tag to the to-be-transmitted short message and backing up the to-be-transmitted short message added with the backup tag to the server; when a transmission command is received, transmitting the to-be-transmitted short message added with the backup tag to an information receiving device.

20 Claims, 6 Drawing Sheets

(51) Int. Cl.
*H04L 29/08* (2006.01)
*H04L 12/58* (2006.01)
*H04W 4/14* (2009.01)

(52) U.S. Cl.
CPC ............ *H04L 63/083* (2013.01); *H04L 63/10* (2013.01); *H04L 67/1095* (2013.01); *H04L 67/1097* (2013.01); *H04W 4/14* (2013.01)

(58) Field of Classification Search
CPC ......... H04L 63/10; H04L 51/18; H04L 51/04; H04L 63/083
USPC ....................................................... 726/4, 28
See application file for complete search history.

INFORMATION TRANSMITTING METHOD AND DEVICE AND INFORMATION RECEIVING METHOD AND DEVICE

CROSS-REFERENCE TO RELATED APPLICATION(S)

This application is a continuation in part of international Patent Application PCT No. PCT/CN2014/074227, entitled "INFORMATION TRANSMITTING METHOD AND DEVICE AND INFORMATION RECEIVING METHOD AND DEVICE", filed on Mar. 27, 2014, the content of which is herein incorporated by reference in its entirety.

TECHNICAL FIELD

The present disclosure relates to a technical field of terminals, and specifically to an information transmitting method, an information receiving method, an information transmitting device, and an information receiving device.

BACKGROUND

With the wide use of smart phones, people's requirements on the security and privacy for mobile phones are higher and higher. The privacy for short messages as an important communication mode is being paid close attention to by more and more users.

Currently, normal short messages received by terminals (for example, mobile phones) are automatically saved in the mobile phones. For example, for private short messages, users might need to click "menu", and select "delete" option to perform the short message deleting operations. In some mobile phones, the private short messages are transferred to the recycle bin after the deleting operation is performed. In such instances, users could only delete the short messages completely after accessing the recycle bin and performing the deleting operation again, which is quite troublesome.

SUMMARY

The present disclosure is addressed to the above problem and proposes a new information transmitting technology by which the short message may be directly deleted when the short message has been read by the receiver and a message reading interface is closed; when the user need to view again, the short message may be extracted again from the server to be viewed if the password is verified as valid by the server, and thus not only is the privacy for the short message increased, but repeated viewing is also allowed.

In view of this, according to one aspect of the present disclosure, an information transmitting method applied in an information transmitting device is provided. The information transmitting method comprises: selecting a target transmission mode from transmission modes for a to-be-transmitted short message in response to receiving a selection command, wherein the transmission modes include a disappear-after-reading transmission mode and a normal transmission mode; prompting a user whether to back up the to-be-transmitted short message to a server, when the target transmission mode is the disappear-after-reading transmission mode; adding a backup tag to the to-be-transmitted short message and backing up the to-be-transmitted short message with the backup tag to the server, when a command for backing up the to-be-transmitted short message to the server is received; and transmitting the to-be-transmitted short message with the backup tag to an information receiving device when a transmission command is received, thus allowing the information receiving device to view, on the basis of the backup tag in the short message received, the short message on the server when the short message has been read and deleted.

In some implementations, the short message transmitted in the disappear-after-reading mode is backed up to the server and the backup tag is added to the short message, such that when the short message with the backup tag is received, the short message is directly deleted and could not be saved when the short message has been read and a message reading interface has been closed, thus preventing the content of the short message from being divulged and greatly increasing the privacy for the short message, since the short message with the backup tag is transmitted in the disappear-after-reading mode. Meanwhile, as the short message with the backup tag has been backed up on the server, the short message could be viewed again by accessing the short message backed up on the server when the short message has been read and deleted, thus avoiding the problem in prior art that the short message could not be viewed again when having been deleted.

In some implementations, a short message transmitted in a normal mode is automatically saved after being read, and could be repeatedly read. Thus, it is unnecessary to back up to the server, so as to reduce the server load. Moreover, it should be noted that when the short message is transmitted in the disappear-after-reading mode, it may be decided whether the short message is backed up to the server. If the privacy for the short message is high, it may be decided that the short message is not backed up to the server, and thus the short message transmitted in the disappear-after-reading mode could not be viewed again by accessing the server, after it is received.

Disappear-after-reading mode information may be tagged with a flag bit. For example, when the normal mode is selected for transmitting the short message, the flag bit of disappear-after-reading in the short message is set to be "0", and the short message is transmitted in the normal mode by default. When it is decided that the short message is transmitted in the disappear-after-reading mode, the flag bit of disappear-after-reading in the short message is set to be "1". And, when the short message transmitted in the disappear-after-reading mode is backed up to the server, the flag bit of disappear-after-reading in the short message may be set to be "2", to indicate that the short message has been transmitted in the disappear-after-reading mode and has been already backed up to the server. In some implementations, persons skilled in the art would understand that a disappear-after-reading tag may have many forms which are not limited herein.

In the above implementations, it is preferable to, before backing up the short message with the backup tag to the server, further comprise: judging whether a password corresponding to the information transmitting device is saved on the server; and backing up the short message to the server when the password corresponding to the information transmitting device has already been saved on the server, and extracting the attribute information of the short message as search keywords thereof, thus allowing the information receiving device to search for the short message on the basis of the keywords.

In some implementations, when the short message transmitted in the disappear-after-reading mode is backed up to the server, the corresponding password is set during the backup, such that users who do not know without the password could not back up and view the short message on the server, thereby enhancing the security of the backup short message. Meanwhile, when backing up the short message, the attribute information of the short message is extracted as search keywords thereof, thereby facilitating quickly finding the corresponding message for reading by searching for the keywords when the backup short messages are quite many.

For example, the attribute information of the short message may include one of the followings: the number of the mobile phone transmitting short message, the content of the message and the transmitting time, or their combination. In a preferred implementation, the short messages backed up on the server may be stored in an ascending order of the transmitting time, thereby facilitating finding the backup short messages. In some implementations, persons skilled in the art would understand the storage form of the backup short messages on the server is not limited herein.

In the above implementations, it is preferable to prompt the user to create a password when the password corresponding to the information transmitting device is not saved on the server.

In some implementations, when the password corresponding to the information transmitting device backing up the short message is not saved on the server, the user is prompted to create a password for backing up the short message (accessing the server). By setting the password for backing up the short message, users who do not know without the password could not back up and view the short message on the server, thereby enhancing the security of the backup short message.

In the above implementations, it is preferable to further comprise: adding a disappear-after-reading tag to the to-be-transmitted short message when a command for not backing up the to-be-transmitted short message to the server is received, and transmitting the short message in the disappear-after-reading transmission mode to the information receiving device.

In this technical solution, when it is unnecessary to back up the short message transmitted in the disappear-after-reading mode to the server, the disappear-after-reading tag, instead of the backup tag, is added to the short message, such that the user is reminded that the short message will be transmitted in the disappear-after-reading mode to the information receiving device, and will not be backed up to the server. The short message is directly deleted and could not be repeatedly viewed when it has been received, read and closed.

In the above implementations, it is preferable to further comprise: transmitting the to-be-transmitted short message in the normal transmission mode to the information receiving device when it is detected that the target transmission mode is the normal transmission mode.

In some implementations, when the selected transmission mode is the normal transmission mode, the short message is transmitted in the normal transmission mode. The normal short message is directly saved after being received, and could be repeatedly viewed, and thus it is unnecessary to back up to the server, so as to reduce the server load.

According to the second aspect of the present disclosure, an information receiving method applied in an information receiving device, comprises: receiving a short message transmitted by an information transmitting device; judging whether a backup tag or a disappear-after-reading tag is contained in the short message; and, when the backup tag is contained in the short message, deleting the content of the short message on the basis of a close command received, after the short message is opened, and extracting the short message backed up on the server for a user to read when a command for opening the short message is received again.

In some implementations, as the backup tag is added to the short message when the short message transmitted in the disappear-after-reading mode is backed up to the server, it is may be judged whether the short message received is a disappear-after-reading short message, by judging whether the backup tag or the disappear-after-reading tag is contained in the short message received. If the backup tag or the disappear-after-reading tag is contained in the short message received, the short message is the one transmitted in the disappear-after-reading mode. When the short message has been read and a command for closing a short message displaying interface is received, the short message is directly deleted and could not be saved, thus preventing the content of the short message from being divulged and greatly increasing the privacy for the short message.

For example, if the backup tag is contained in the short message received, the short message could be viewed again by accessing the server when having been read and closed, thus avoiding the problem in prior art that the short message could not be viewed again when having been deleted, since the short message has been backed up on the server. However, if the disappear-after-reading tag is contained in the short message received, it is indicated that the short message is not backed up to the server when being transmitted, and could not be viewed again when having been read and closed.

In the above implementations, it is preferable to, before extracting the short message backed up on the server for the user to read, further comprise: prompting the user to input a password corresponding to the backup short message, and verifying whether the password is input correctly; when the password is input correctly, extracting the short message backed up on the server for the user to read.

In some implementations, when the short message backed up on the server is extracted for the user to read, the password is verified. If the password is input correctly, the disappear-after-reading short message deleted and backed up could be viewed repeatedly; if the password is input incorrectly, the short message backed up could not be extracted, and the security of the short message on the backup server is enhanced.

In the above implementations, it is preferable to further comprise: when the disappear-after-reading tag is contained in the short message, deleting the content of the short message on the basis of the close command received, after the short message is read.

In some implementations, if the disappear-after-reading tag is contained in the short message received, it is indicated that the short message is not backed up to the server when being transmitted. The short message containing the disappear-after-reading tag is directly deleted and could not be viewed again when having been read and closed.

In the implementations, it is preferable to further comprise: displaying the received short message containing the backup tag or the disappear-after-reading tag, wherein when the short message is not opened, the short message can be displayed in a first display style; and if opened, the short message can be displayed in a second display style.

In some implementations, by displaying the short message associated with the backup tag or the disappear-after-reading tag in the first or second display style depending on it being opened or not opened, it may be visually displayed whether the short message has been opened. When a plurality of short messages associated with the backup tag or the disappear-after-reading tag are received simultaneously, whether each of the plurality of short messages has been opened can be judged by means of the display style. In some implementations, whether the short message is deleted can also be judged in a similar way. For example, if the short message is displayed in the first display style, it can be indicated that the short message is not opened and could be viewed again; if the short message is opened and a message reading interface is closed, the short message can be displayed in the second display style.

In some implementations, for example, if the short message is displayed in the second display style and the disappear-after-reading tag is associated with the short message, the short message and associated data (e.g., the transmitter, the transmitting time, the content, and so on) could not be viewed even if it is clicked by the user, since the short message has been deleted and is not backed up to the server. For another example, if the short message is displayed in the second display style and the backup tag is associated with the short message, the short message could still be viewed on the server when it is clicked by the user and the password is verified as valid, since the short message has been backed up on the server although it has been deleted.

In the above implementations, the method can further include operations of setting the first display style and/or the second display style on the basis of in response to receiving a setting command.

In some implementations, the first display style and the second display style may be set freely, in which the flexibility of the display styles can be enhanced. For example, the first display style may be set to be a sealed envelope style, and the second display style may be set to be an empty envelop style. Alternatively, the first display style may be set to be an envelope style with a disappear-after-reading tag, and the second display style may be set to be a torn envelope style. This disclosure is not intended to limit the display styles to the aforementioned ones and there are many display styles which are not listed herein.

In some implementations, the second display style of the short message associated with the backup tag can be identical to the second display style of the short message associated with the disappear-after-reading tag ma, but in a more preferred implementation, the second display style of the short message associated with the backup tag be set differently from the second display style of the short message associated with the disappear-after-reading tag, and thus whether the short message could be viewed again may be identified on the basis of the second display style of the short message without opening each short message again.

According to an aspect of the present disclosure, an information transmitting device is provided. The information transmitting device comprises: a selecting unit for selecting a target transmission mode from transmission modes for a to-be-transmitted short message in response to receiving a selection command, wherein the transmission modes include a disappear-after-reading transmission mode and a normal transmission mode; a prompting unit for prompting a user whether to back up the to-be-transmitted short message to a server, when the target transmission mode is the disappear-after-reading transmission mode; a backing up unit for adding a backup tag to the to-be-transmitted short message and backing up the to-be-transmitted short message with the backup tag to the server, when a command for backing up the to-be-transmitted short message to the server is received; and a transmitting unit for transmitting the to-be-transmitted short message with the backup tag to an information receiving device when a transmission command is received, thus allowing the information receiving device to view, on the basis of the backup tag in the short message received, the short message on the server when the short message has been read and deleted.

In some implementations, the short message transmitted in the disappear-after-reading mode is backed up to the server and the backup tag is added to the short message, such that when the short message with the backup tag is received, the short message is directly deleted and could not be saved when the short message has been read and a message reading interface has been closed, thus preventing the content of the short message from being divulged and greatly increasing the privacy for the short message, since the short message with the backup tag is transmitted in the disappear-after-reading mode. Meanwhile, as the short message with the backup tag has been backed up on the server, the short message could be viewed again by accessing the short message backed up on the server when the short message has been read and deleted, thus avoiding the problem in prior art that the short message could not be viewed again when having been deleted.

For example, a short message transmitted in a normal mode is automatically saved after being read, and could be repeatedly read. Thus, it is unnecessary to back up to the server, so as to reduce the server load. Moreover, it should be noted that when the short message is transmitted in the disappear-after-reading mode, it may be decided whether the short message is backed up to the server. If the privacy for the short message is high, it may be decided that the short message is not backed up to the server, and thus the short message transmitted in the disappear-after-reading mode could not be viewed again by accessing the server, after it is received.

Disappear-after-reading information may be tagged with a flag bit. For example, when the normal mode is selected for transmitting the short message, the flag bit of disappear-after-reading in the short message is set to be "0", and the short message is transmitted in the normal mode by default. When it is decided that the short message is transmitted in the disappear-after-reading mode, the flag bit of disappear-after-reading in the short message is set to be "1". And, when the short message transmitted in the disappear-after-reading mode is backed up to the server, the flag bit of disappear-after-reading in the short message may be set to be "2", indicating that the short message has been transmitted in the disappear-after-reading mode and has been already backed up to the server. In some implementations, persons skilled in the art would understand that a disappear-after-reading tag may have many forms which are not limited herein.

In the implementations, it is preferable to further comprise: a judging unit for judging whether a password corresponding to the information transmitting device is saved on the server, before backing up the short message with the backup tag to the server; and an extracting unit for backing up the short message to the server when the password corresponding to the information transmitting device has already been saved on the server, and extracting the attribute information of the short message as search keywords thereof, thus allowing the information receiving device to search for the short message on the basis of the keywords.

In some implementations, when the short message transmitted in the disappear-after-reading mode is backed up to the server, the corresponding password is set during the backup, such that users who do not know without the password could not back up and view the short message on the server, thereby enhancing the security of the backup short message. Meanwhile, when backing up the short message, the attribute information of the short message is extracted as search keywords thereof, thereby facilitating quickly finding the corresponding message for reading by searching for the keywords when the backup short messages are quite many.

Specifically, the attribute information of the short message may include one of the followings: the number of the mobile phone transmitting short message, the content of the message and the transmitting time, or their combination. In a preferred implementation, the short messages backed up on the server may be stored in an ascending order of the transmitting time, thereby facilitating finding the backup short messages. In some implementations, persons skilled in the art would understand the storage form of the backup short messages on the server is not limited herein.

In the above implementations, it is preferable to further comprise: a setting unit for prompting the user to create a password when the password corresponding to the information transmitting device is not saved on the server.

In some implementations, when a password corresponding to the information transmitting device backing up the short message is not saved on the server, the user is prompted to create a password for backing up the short message (accessing the server). By setting the password for backing up the short message, users who do not know without the password could not back up and view the short message on the server, thereby enhancing the security of the backup short message.

In the above implementations, it is preferable to further comprise: a tag adding unit for adding a disappear-after-reading tag to the to-be-transmitted short message when a command for not backing up the to-be-transmitted short message to the server is received, wherein the transmitting unit is for transmitting the short message in the disappear-after-reading transmission mode to the information receiving device.

In some implementations, when it is unnecessary to back up the short message transmitted in the disappear-after-reading mode to the server, the disappear-after-reading tag, instead of the backup tag, is added to the short message, such that the user is reminded that the short message will be transmitted in the disappear-after-reading mode to the information receiving device, and will not be backed up to the server. The short message is directly deleted and could not be repeatedly viewed when it has been received, read and closed.

In the above implementations, preferably, the transmitting unit is further for transmitting the to-be-transmitted short message in the normal transmission mode to the information receiving device when it is detected that the target transmission mode is the normal transmission mode.

In some implementations, when the selected transmission mode is the normal transmission mode, the short message is transmitted in the normal transmission mode. The normal short message is directly saved after being received, and could be repeatedly viewed, and thus it is unnecessary to back up to the server, so as to reduce the server load.

According to the fourth aspect of the present disclosure, an information receiving device is provided. The information receiving device comprises: a receiving unit for receiving a short message transmitted by an information transmitting device; a judging unit for judging whether a backup tag or a disappear-after-reading tag is associated with the short message; and a processing unit for, when the backup tag is associated with the short message, deleting the content of the short message on the basis of a close command received, after the short message is opened, and extracting the short message backed up on the server for a user to read when a command for opening the short message is received again.

In some implementations, as the backup tag is added to the short message when the short message transmitted in the disappear-after-reading mode is backed up to the server, it is may be judged whether the short message received is a disappear-after-reading short message, by judging whether the backup tag or the disappear-after-reading tag is associated with the short message received. If the backup tag or the disappear-after-reading tag is associated with the short message received, the short message is the one transmitted in the disappear-after-reading mode. When the short message has been read and a command for closing a short message displaying interface is received, the short message is directly deleted and could not be saved, thus preventing the content of the short message from being divulged and greatly increasing the privacy for the short message.

In some implementations, if the backup tag is associated with the short message received, the short message could be viewed again by accessing the server when having been read and closed, thus avoiding the problem in prior art that the short message could not be viewed again when having been deleted, because the short message has been backed up on the server. However, if the disappear-after-reading tag is associated with the short message received, it is indicated that the short message is not backed up to the server when being transmitted, and could not be viewed again when having been read and closed.

In the above implementations, it is preferable to further comprise: an prompting unit for, before extracting the short message backed up on the server for the user to read, prompting the user to input a password corresponding to the backup short message; a password matching unit for verifying whether the password is input correctly; and an extracting unit for, when the password is input correctly, extracting the short message backed up on the server for the user to read.

In some implementations, when the short message backed up on the server is extracted for the user to read, the password is verified. If the password is input correctly, the disappear-after-reading short message deleted and backed up could be viewed repeatedly; if the password is input incorrectly, the short message backed up could not be extracted, and the security of the short message on the backup server is enhanced.

In the above implementations, preferably, the processing unit is for, when the disappear-after-reading tag is associated with the short message, deleting the content of the short message on the basis of the close command received, after the short message is read.

In some implementations, if the disappear-after-reading tag is associated with the short message received, it is indicated that the short message is not backed up to the server when being transmitted. The short message associated with the disappear-after-reading tag is directly deleted and could not be viewed again when having been read and closed.

In the above implementations, it is preferable to further comprise: a displaying unit for displaying the received short message associated with the backup tag or the disappear-after-reading tag, wherein when the short message is not opened, the short message is displayed in a first display style; and when the short message is opened, the short message is displayed in a second display style.

In some implementations, by displaying the short message associated with the backup tag or the disappear-after-reading tag in two display style when being opened and not opened, it is may be visually displayed whether the short message has been opened. When a plurality of short messages associated with the backup tag or the disappear-after-reading tag are received simultaneously, whether each of the plurality of short messages has been opened is judged by means of the display style, that is to say, whether the short message is deleted is judged. If the short message is displayed in the first display style, the short message is not opened and could be viewed again; if the short message is opened and a message reading interface is closed, the short message is displayed in the second display style.

When the short message is displayed in the second display style and the disappear-after-reading tag is associated with the short message, the short message including the transmitter of the short message, the transmitting time and the content of the short message and so on, could not be viewed even if it is clicked by the user, because the short message has been deleted and is not backed up to the server. However, when the short message is displayed in the second display style and the backup tag is associated with the short message, the short message could still be viewed on the server when it is clicked by the user and the password is verified as valid, since the short message has been backed up on the server although it has been deleted.

In the above implementations, it is preferable to further comprise: a setting unit for setting the first display style and/or the second display style on the basis of a setting command received.

In some implementations, the first display style and the second display style may be set freely, and the flexibility of the display styles is enhanced. For example, the first display style may be set to be a sealed envelope style, and the second display style may be set to be an empty envelop style. Alternatively, the first display style may be set to be an envelope style with a disappear-after-reading tag, and the second display style may be set to be a torn envelope style. In some implementations, there are many display styles which are not listed herein.

In some implementations, the second display style of the short message associated with the backup tag and the second display style of the short message associated with the disappear-after-reading tag may be identical, but in a more preferred implementation, the second display style of the short message associated with the backup tag and the second display style of the short message associated with the disappear-after-reading tag may be set differently, and thus whether the short message could be viewed again may be identified on the basis of the second display style of the short message, avoiding trying to view again by opening each short message.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure is further described in detail hereinafter with reference to the drawings and the implementations, in order to more fully understand above-mentioned purposes, features and advantages of the present disclosure. It should be noted that, when not conflicting, the implementations of the present application and features in the implementations could be combined mutually.

Details are set forth in the below description so as to fully understand the present disclosure, however, the present disclosure may also be implemented by adopting other implementations different from those as described herein, and therefore, the scope of the present disclosure is not limited by the implementations disclosed below.

Figure 1:
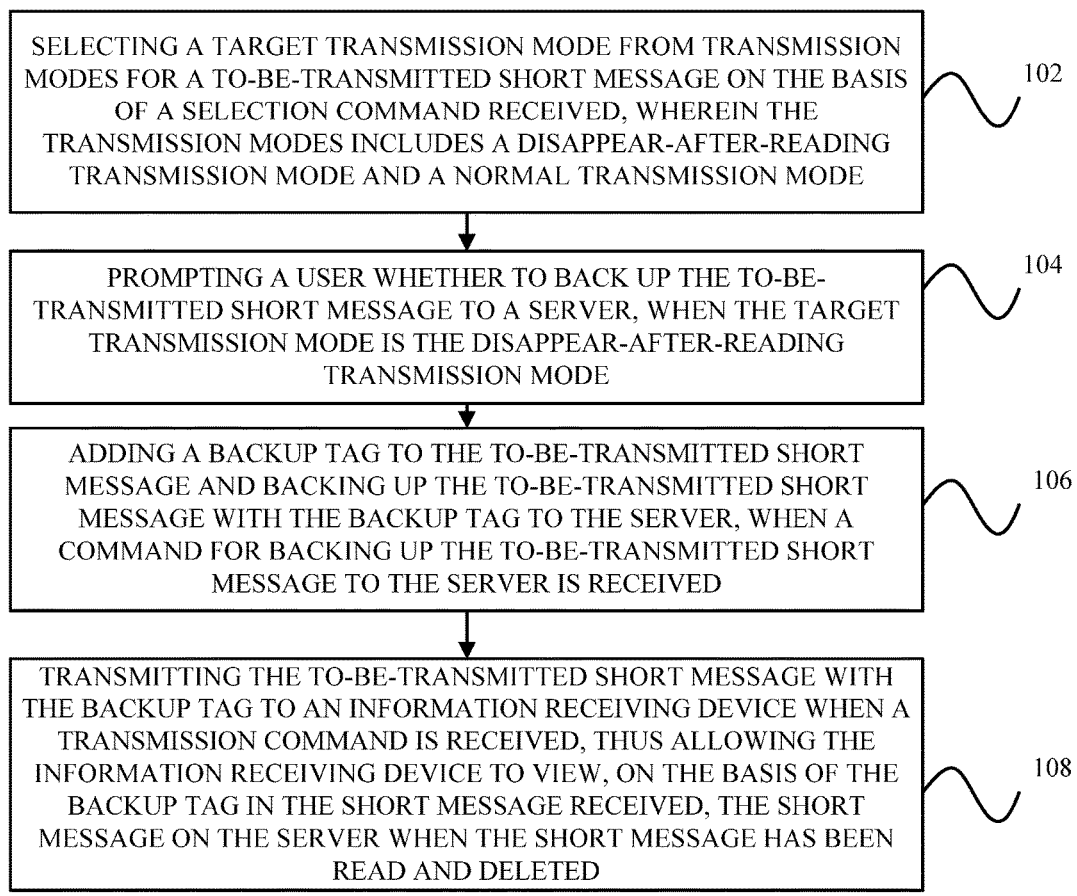
FIG. 1 shows a schematic flowchart of an information transmitting method according to an implementation of the present disclosure.

FIG. 1 shows a schematic flowchart of an information transmitting method according to an implementation of the present disclosure.

As shown in FIG. 1, an information transmitting method according to an example implementation of the present disclosure, applied in an information transmitting device, comprises: step 102 of selecting a target transmission mode from transmission modes for a to-be-transmitted short message in response to receiving a selection command, wherein the transmission modes include a disappear-after-reading transmission mode and a normal transmission mode; step 104 of prompting a user whether to back up the to-be-transmitted short message to a server, when the target transmission mode is the disappear-after-reading transmission mode; step 106 of adding a backup tag to the to-be-transmitted short message and backing up the to-be-transmitted short message with the backup tag to the server, when a command for backing up the to-be-transmitted short message to the server is received; and step 108 of transmitting the to-be-transmitted short message with the backup tag to an information receiving device when a transmission command is received, thus allowing the information receiving device to view, on the basis of the backup tag in the short message received, the short message on the server when the short message has been read and deleted. The to-be-transmitted short message can include, for example, a text message, a multi-media message, a graphical message, an audio message, or any other message that can transmit information to a user.

In the technical solution, the short message transmitted in the disappear-after-reading mode is backed up to the server and the backup tag is added to the short message, such that when the short message with the backup tag is received, the short message is directly deleted and could not be saved when the short message has been read and a message reading interface has been closed, thus preventing the content of the short message from being divulged and greatly increasing the privacy for the short message, since the short message with the backup tag is transmitted in the disappear-after-reading mode. Meanwhile, as the short message with the backup tag has been backed up on the server, the short message could be viewed again by accessing the short message backed up on the server when the short message has been read and deleted, thus avoiding the problem in prior art that the short message could not be viewed again when having been deleted.

Naturally, a short message transmitted in a normal mode is automatically saved after being read, and could be repeatedly read. Thus, it is unnecessary to back up to the server, so as to reduce the server load. Moreover, it should be noted that when the short message is transmitted in the disappear-after-reading mode, it may be decided whether the short message is backed up to the server. If the privacy for the short message is high, it may be decided that the short message is not backed up to the server, and thus the short message transmitted in the disappear-after-reading mode could not be viewed again by accessing the server, after it is received.

Disappear-after-reading may be tagged with a flag bit. For example, when the normal mode is selected for transmitting the short message, the flag bit of disappear-after-reading in the short message is set to be "0", and the short message is transmitted in the normal mode by default. When it is decided that the short message is transmitted in the disappear-after-reading mode, the flag bit of disappear-after-reading in the short message is set to be "1". And, when the short message transmitted in the disappear-after-reading mode is backed up to the server, the flag bit of disappear-after-reading in the short message may be set to be "2", indicating that the short message has been transmitted in the disappear-after-reading mode and has been already backed up to the server. In some implementations, persons skilled in the art would understand that a disappear-after-reading tag may have many forms which are not limited herein.

In the above technical solution, it is preferable to, before backing up the short message with the backup tag to the server, further comprise: Judging whether a password corresponding to the information transmitting device is saved on the server; and backing up the short message to the server when the password corresponding to the information transmitting device has already been saved on the server, and extracting the attribute information of the short message as search keywords thereof, thus allowing the information receiving device to search for the short message on the basis of the keywords.

In this technical solution, when the short message transmitted in the disappear-after-reading mode is backed up to the server, the corresponding password is set during the backup, such that users who do not know the password could not back up and view the short message on the server, thereby enhancing the security of the backup short message. Meanwhile, when backing up the short message, the attribute information of the short message is extracted as search keywords thereof, thereby facilitating quickly finding the corresponding message for reading by searching for the keywords when the backup short messages are quite many.

Specifically, the attribute information of the short message may include one of the followings: the number of the mobile phone transmitting short message, the content of the message and the transmitting time, or their combination. In a preferred implementation, the short messages backed up on the server may be stored in an ascending order of the transmitting time, thereby facilitating finding the backup short messages. In some implementations, persons skilled in the art would understand the storage form of the backup short messages on the server is not limited herein.

In the above technical solution, it is preferable to prompt the user to create a password when the password corresponding to the information transmitting device is not saved on the server.

In this technical solution, when the password corresponding to the information transmitting device backing up the short message is not saved on the server, the user is prompted to create a password for backing up the short message (accessing the server). By setting the password for backing up the short message, users who do not know the password could not back up and view the short message on the server, thereby enhancing the security of the backup short message.

In the above technical solution, it is preferable to further comprise: adding a disappear-after-reading tag to the to-be-transmitted short message when a command for not backing up the to-be-transmitted short message to the server is received, and transmitting the short message in the disappear-after-reading transmission mode to the information receiving device.

In this technical solution, when it is unnecessary to back up the short message transmitted in the disappear-after-reading mode to the server, the disappear-after-reading tag, instead of the backup tag, is added to the short message, such that the user is reminded that the short message will be transmitted in the disappear-after-reading mode to the information receiving device, and will not be backed up to the server. The short message is directly deleted and could not be repeatedly viewed when it has been received, read and closed.

In the above technical solution, it is preferable to further comprise: transmitting the to-be-transmitted short message in the normal transmission mode to the information receiving device when it is detected that the target transmission mode is the normal transmission mode.

In this technical solution, when the selected transmission mode is the normal transmission mode, the short message is transmitted in the normal transmission mode. The normal short message is directly saved after being received, and could be repeatedly viewed, and thus it is unnecessary to back up to the server, so as to reduce the server load.

Figure 2:
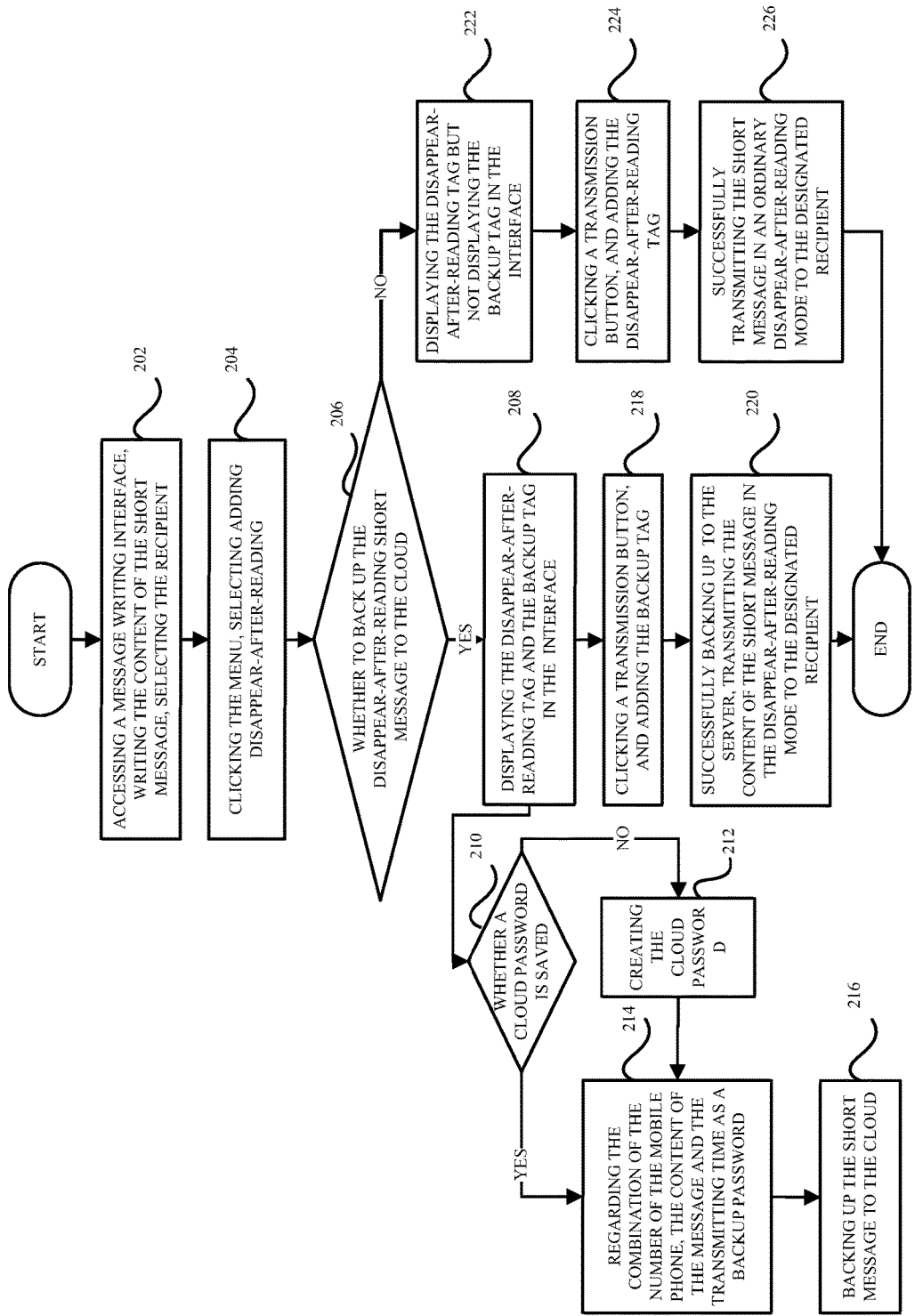
FIG. 2 shows a specific flowchart of an information transmitting method according to an implementation of the present disclosure.

FIG. 2 shows a specific flowchart of an information transmitting method according to an implementation of the present disclosure.

As shown in FIG. 2, the specific flowchart of the information transmitting method according to an implementation of the present disclosure, includes the following steps.

Step 202 is normally initiating a short message application, accessing a message writing interface, receiving the content of the short message written by the user, and receiving the recipient of the short message selected by the user.

Step 204 is transmitting the short message in the disappear-after-reading mode when it is detected that the user selects adding a disappear-after-reading tag from options in the menu.

Step 206 is prompting the user whether it is necessary to back up the short message transmitted in the disappear-after-reading mode to the server (the server is described by taking a cloud server for an example) when the short message is transmitted in the disappear-after-reading mode, and if so, performing step 208; if not, performing step 222.

Step 208 is displaying the disappear-after-reading tag and the backup tag in the short message displaying interface when it is necessary to back up the short message transmitted in the disappear-after-reading mode to the cloud server.

Step 210 is judging whether a cloud password is saved when the short message transmitted in the disappear-after-reading mode is backed up to the cloud server, and if so, performing step 214; if not, performing step 212.

Step 212 is creating the cloud password in order to ensure the security of the short message on the cloud if the cloud password is not saved.

Step 214 is extracting the attribute information of the short message as keywords and backing up the short message when the cloud password is created or the password is saved on the cloud, wherein the attribute information of the short message may include one of the followings: the number of the mobile phone transmitting short message, the content of the message and the transmitting time, or their combination. Hence, extracting several attribute information of the short message may facilitate the information receiving device finding.

Step 216 is backing up the short message to the cloud, and completing backing up the short message.

Step 218 is clicking a transmission button, and adding the backup tag to the short message.

Step 220 is transmitting the short message to the designated recipient in the disappear-after-reading mode of backing up to the cloud.

Step 222 is displaying the disappear-after-reading tag but not displaying the backup tag in the short message displaying interface when it is unnecessary to back up the short message transmitted in the disappear-after-reading mode to the cloud.

Step 224 is clicking a transmission button, and adding the disappear-after-reading tag to the short message.

Step 226 is transmitting the short message in an ordinary disappear-after-reading mode to the designated recipient.

Figure 3:
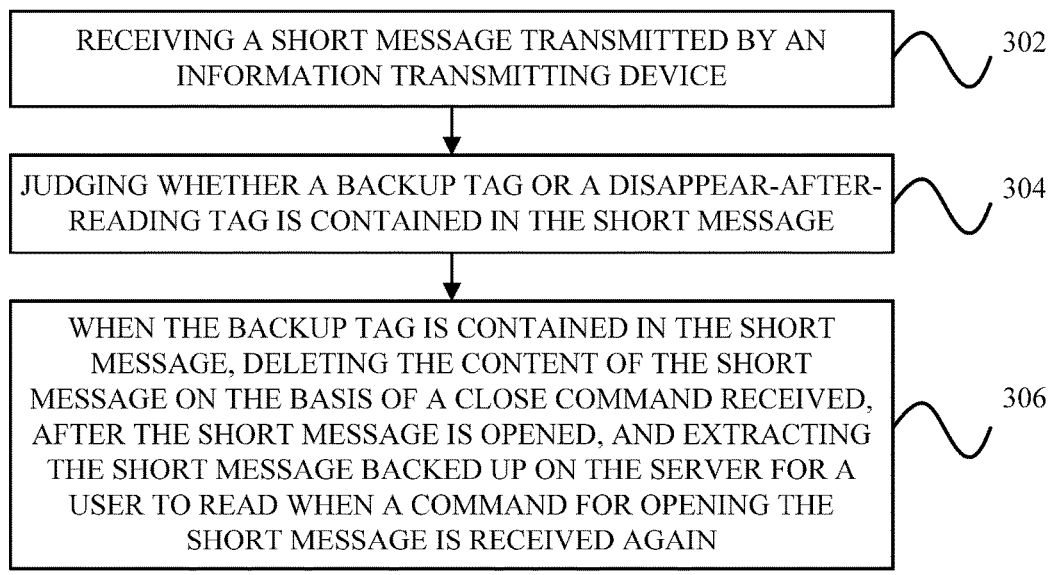
FIG. 3 shows a schematic flowchart of a method of an implementation of the present disclosure.

FIG. 3 shows a schematic flowchart of an information receiving method according to an implementation of the present disclosure.

As shown in FIG. 3, an method of an implementation of the present disclosure, applied in an information receiving device, comprises: step 302 of receiving a short message transmitted by an information transmitting device; step 304 of judging whether a backup tag or a disappear-after-reading tag is associated with the short message; and step 306 of, when the backup tag is associated with the short message, deleting the content of the short message on the basis of a close command received, after the short message is opened, and extracting the short message backed up on the server for a user to read when a command for opening the short message is received again.

In this technical solution, as the backup tag is added to the short message when the short message transmitted in the disappear-after-reading mode is backed up to the server, it is may be judged whether the short message received is a disappear-after-reading short message, by judging whether the backup tag or the disappear-after-reading tag is associated with the short message received. If the backup tag or the disappear-after-reading tag is associated with the short message received, the short message is the one transmitted in the disappear-after-reading mode. When the short message has been read and a command for closing a short message displaying interface is received, the short message is directly deleted and could not be saved, thus preventing the content of the short message from being divulged and greatly increasing the privacy for the short message.

In some implementations, if the backup tag is associated with the short message received, the short message could be viewed again by accessing the server when having been read and closed, thus avoiding the problem in prior art that the short message could not be viewed again when having been deleted, since the short message has been backed up on the server. However, if the disappear-after-reading tag is associated with the short message received, it is indicated that the short message is not backed up to the server when being transmitted, and could not be viewed again when having been read and closed.

In the above technical solution, it is preferable to, before extracting the short message backed up on the server for the user to read, further comprise: prompting the user to input a password corresponding to the backup short message, and verifying whether the password is input correctly; when the password is input correctly, extracting the short message backed up on the server for the user to read.

In this technical solution, when the short message backed up on the server is extracted for the user to read, the password is verified. If the password is input correctly, the disappear-after-reading short message deleted and backed up could be viewed repeatedly; if the password is input incorrectly, the short message backed up could not be extracted, and the security of the short message on the backup server is enhanced.

In the above technical solution, it is preferable to further comprise: when the disappear-after-reading tag is associated with the short message, deleting the content of the short message on the basis of the close command received, after the short message is read.

In this technical solution, if the disappear-after-reading tag is associated with the short message received, it is indicated that the short message is not backed up to the server when being transmitted. The short message associated with the disappear-after-reading tag is directly deleted and could not be viewed again when having been read and closed.

In the above technical solution, it is preferable to further comprise: displaying the received short message associated with the backup tag or the disappear-after-reading tag, wherein when the short message is not opened, the short message is displayed in a first display style; and when the short message is opened, the short message is displayed in a second display style.

In this technical solution, by displaying the short message associated with the backup tag or the disappear-after-reading tag in two display style when being opened and not opened, it is may be visually displayed whether the short message has been opened. When a plurality of short messages associated with the backup tag or the disappear-after-reading tag are received simultaneously, whether each of the plurality of short messages has been opened is judged by means of the display style, that is to say, whether the short message being deleted is judged. If the short message is displayed in the first display style, the short message is not opened and could be viewed again; if the short message is opened and a message reading interface is closed, the short message is displayed in the second display style.

When the short message is displayed in the second display style and the disappear-after-reading tag is associated with the short message, the short message including the transmitter of the short message, the transmitting time and the content of the short message and so on, could not be viewed even if it is clicked by the user, since the short message has been deleted and is not backed up to the server. However, when the short message is displayed in the second display style and the backup tag is associated with the short message, the short message could still be viewed on the server when it is clicked by the user and the password is verified as valid, for the short message has been backed up on the server although it has been deleted.

In the above technical solution, it is preferable to further comprise: setting the first display style and/or the second display style on the basis of a setting command received.

In this technical solution, the first display style and the second display style may be set freely, and the flexibility of the display styles is enhanced. For example, the first display style may be set to be a sealed envelop style, and the second display style may be set to be an empty envelop style. Alternatively, the first display style may be set to be an envelop style with a disappear-after-reading tag, and the second display style may be set to be a torn envelop style. In some implementations, there are many display styles which are not listed herein.

In some implementations, the second display style of the short message associated with the backup tag and the second display style of the short message associated with the disappear-after-reading tag may be identical, but in a more preferred implementation, the second display style of the short message associated with the backup tag and the second display style of the short message associated with the disappear-after-reading tag may be set differently, and thus whether the short message could be viewed again may be identified on the basis of the second display style of the short message, avoiding trying to view again by opening each short message.

Figure 4:
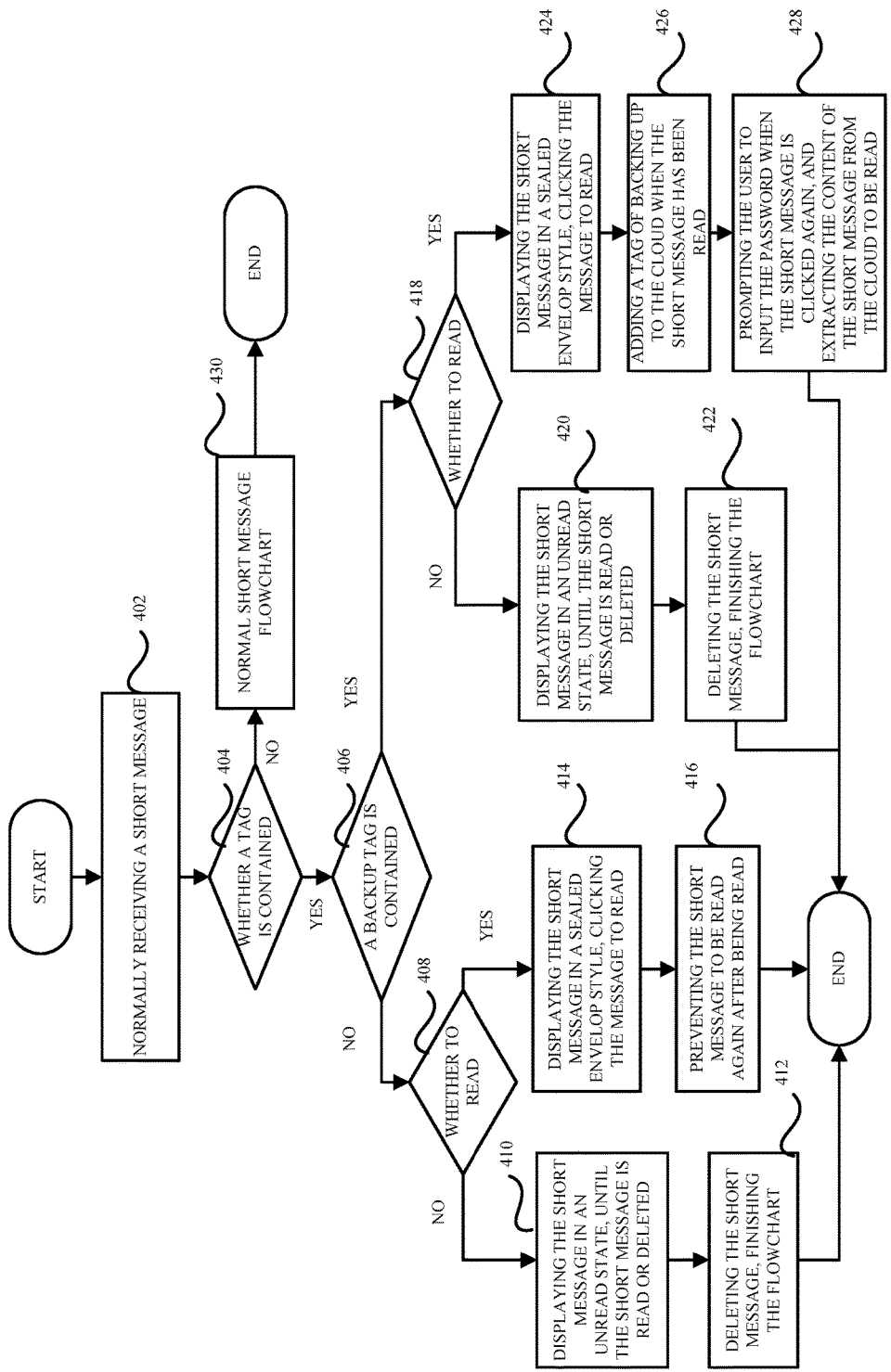
FIG. 4 shows a specific flowchart of an method of an implementation of the present disclosure.

FIG. 4 shows a specific flowchart of an information receiving method according to an implementation of the present disclosure.

As shown in FIG. 4, the specific flowchart of the information receiving method according to an implementation of the present disclosure, includes the following steps.

Step 402 is receiving a short message.

Step 404 is judging whether a backup tag or a disappear-after-reading tag is associated with the short message, and if so, performing step 406; if not, performing step 430.

Step 406 is judging whether a backup tag is associated with the short message, and if so, performing step 418; if not, performing step 408.

Step 408 is, judging whether to read the short message when the disappear-after-reading tag instead of the backup tag is associated with the short message, and if so, performing step 414; and if not, performing step 410.

Step 410 is displaying the short message in an unread state if it is not read, until the short message is read.

Step 412 is deleting the disappear-after-reading short message as the normal message no matter it is unread or read, wherein the short message could not be viewed again if being deleted.

Step 414 is clicking the disappear-after-reading short message to read, if it is necessary to read the short message.

Step 416 is changing the state of the short message from an unread one to a read one, when the disappear-after-reading message has been viewed and read, wherein a video of burning an envelope may be displayed, indicating disappear-after-reading, when a short message reading interface is closed, and the read message which could not be viewed and read again is displayed in the second display style.

Step 418 is judging whether to read the short message when the backup tag is associated with the short message, and if so, performing step 424; and if not, performing step 420.

Step 420 is displaying (in the first display style) the short message in an unread state if it is not read, until the short message is read.

Step 422 is deleting the disappear-after-reading short message associated with the backup tag as the normal message no matter it is unread or read, wherein the short message could not be viewed again if being deleted.

Step 424 is clicking the disappear-after-reading short message associated with the backup tag to read, if it is necessary to read the short message.

Step 426 is changing the state of the short message from an unread one to a read one, when the disappear-after-reading message has been viewed and read, wherein a video of burning an envelop may be displayed, indicating disappear-after-reading, when a short message reading interface is closed, and the read message is displayed in the second display style.

Step 428 is prompting the user to input the password when the short message displayed in the second style is clicked again, wherein the cloud may be accessed if the password is verified as valid and the disappear-after-reading short message may be searched for in the cloud and viewed, with the mobile phone number of the transmitter, the message content and the transmitting time serving as keywords; if the password is verified as invalid, the short message could not be read again.

Step 430 is receiving the short message as a normal one if the backup tag or the disappear-after-reading tag is not associated with the short message.

Figure 5:
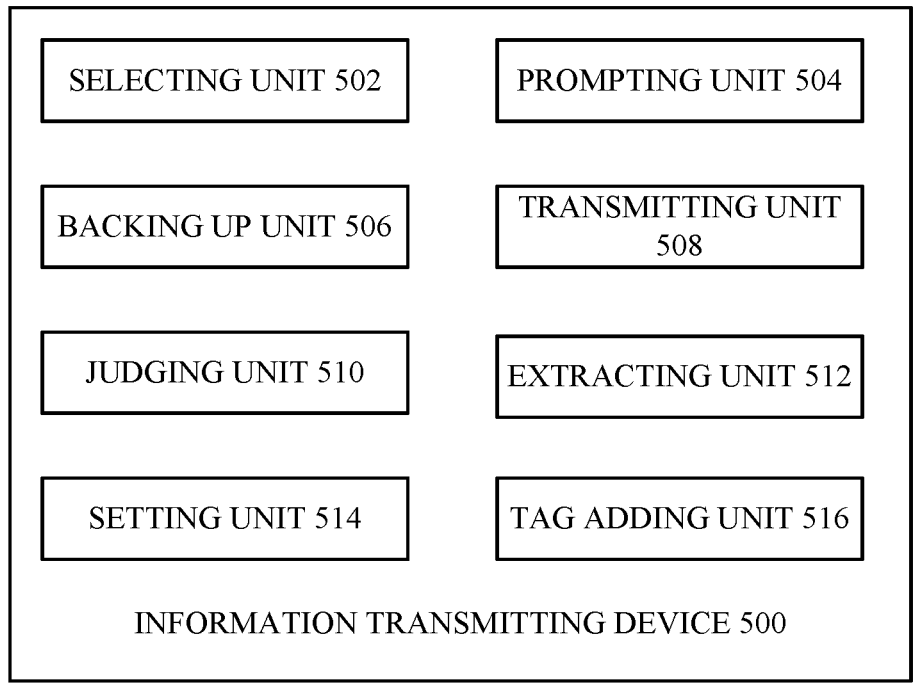
FIG. 5 shows a schematic structural diagram of an information transmitting device according to an implementation of the present disclosure.

FIG. 5 shows a schematic structural diagram of an information transmitting device according to an implementation of the present disclosure.

As shown in FIG. 5, an information transmitting device 500 according to an implementation of the present disclosure, comprises: a selecting unit 502 for selecting a target transmission mode from transmission modes for a to-be-transmitted short message in response to receiving a selection command, wherein the transmission modes include a disappear-after-reading transmission mode and a normal transmission mode; a prompting unit 504 for prompting a user whether to back up the to-be-transmitted short message to a server, when the target transmission mode is the disappear-after-reading transmission mode; a backing up unit 506 for adding a backup tag to the to-be-transmitted short message and backing up the to-be-transmitted short message with the backup tag to the server, when a command for backing up the to-be-transmitted short message to the server is received; and a transmitting unit 508 for transmitting the to-be-transmitted short message with the backup tag to an information receiving device when a transmission command is received, thus allowing the information receiving device to view, on the basis of the backup tag in the short message received, the short message on the server when the short message has been read and deleted.

In the technical solution, the short message transmitted in the disappear-after-reading mode is backed up to the server and the backup tag is added to the short message, such that when the short message with the backup tag is received, the short message is directly deleted and could not be saved when the short message has been read and a message reading interface has been closed, thus preventing the content of the short message from being divulged and greatly increasing the privacy for the short message, for the short message with the backup tag is transmitted in the disappear-after-reading mode. Meanwhile, as the short message with the backup tag has been backed up on the server, the short message could be viewed again by accessing the short message backed up on the server when the short message has been read and deleted, thus avoiding the problem in prior art that the short message could not be viewed again when having been deleted.

Naturally, a short message transmitted in a normal mode is automatically saved after being read, and could be repeatedly read. Thus, it is unnecessary to back up to the server, so as to reduce the server load. Moreover, it should be noted that when the short message is transmitted in the disappear-after-reading mode, it may be decided whether the short message is backed up to the server. If the privacy for the short message is high, it may be decided that the short message is not backed up to the server, and thus the short message transmitted in the disappear-after-reading mode could not be viewed again by accessing the server, after it is received.

Disappear-after-reading may be tagged with a flag bit. For example, when the normal mode is selected for transmitting the short message, the flag bit of disappear-after-reading in the short message is set to be "0", and the short message is transmitted in the normal mode by default. When it is decided that the short message is transmitted in the disappear-after-reading mode, the flag bit of disappear-after-reading in the short message is set to be "1". And, when the short message transmitted in the disappear-after-reading mode is backed up to the server, the flag bit of disappear-after-reading in the short message may be set to be "2", indicating that the short message has been transmitted in the disappear-after-reading mode and has been already backed up to the server. In some implementations, persons skilled in the art would understand that a disappear-after-reading tag may have many forms which are not limited herein.

In the above technical solution, it is preferable to further comprise: a judging unit 510 for judging whether a password corresponding to the information transmitting device is saved on the server, before backing up the short message with the backup tag to the server; and an extracting unit 512 for backing up the short message to the server when the password corresponding to the information transmitting device has already been saved on the server, and extracting the attribute information of the short message as search keywords thereof, thus allowing the information receiving device to search for the short message on the basis of the keywords.

In this technical solution, when the short message transmitted in the disappear-after-reading mode is backed up to the server, the corresponding password is set during the backup, such that users who do not know without the password could not back up and view the short message on the server, thereby enhancing the security of the backup short message. Meanwhile, when backing up the short message, the attribute information of the short message is extracted as search keywords thereof, thereby facilitating quickly finding the corresponding message for reading by searching for the keywords when the backup short messages are quite many.

Specifically, the attribute information of the short message may include one of the followings: the number of the mobile phone transmitting short message, the content of the message and the transmitting time, or their combination. In a preferred implementation, the short messages backed up on the server may be stored in an ascending order of the transmitting time, thereby facilitating finding the backup short messages. In some implementations, persons skilled in the art would understand that the storage form of the backup short messages on the server is not limited herein.

In the above technical solution, it is preferable to further comprise: a setting unit 514 for prompting the user to create a password when the password corresponding to the information transmitting device is not saved on the server.

In this technical solution, when the password corresponding to the information transmitting device backing up the short message is not saved on the server, the user is prompted to create a password for backing up the short message (accessing the server). By setting the password for backing up the short message, users who do not know without the password could not back up and view the short message on the server, thereby enhancing the security of the backup short message.

In the above technical solution, it is preferable to further comprise: a tag adding unit 516 for adding a disappear-after-reading tag to the to-be-transmitted short message when a command for not backing up the to-be-transmitted short message to the server is received, wherein the transmitting unit 508 is for transmitting the short message in the disappear-after-reading transmission mode to the information receiving device.

In this technical solution, when it is unnecessary to back up the short message transmitted in the disappear-after-reading mode to the server, the disappear-after-reading tag, instead of the backup tag, is added to the short message, such that the user is reminded that the short message will be transmitted in the disappear-after-reading mode to the information receiving device, and will not be backed up to the server. The short message is directly deleted and could not be repeatedly viewed when it has been received, read and closed.

In the above technical solution, preferably, the transmitting unit 508 is further for transmitting the to-be-transmitted short message in the normal transmission mode to the information receiving device when it is detected that the target transmission mode is the normal transmission mode.

In this technical solution, when the selected transmission mode is the normal transmission mode, the short message is transmitted in the normal transmission mode. The normal short message is directly saved after being received, and could be repeatedly viewed, and thus it is unnecessary to back up to the server, so as to reduce the server load.

Figure 6:
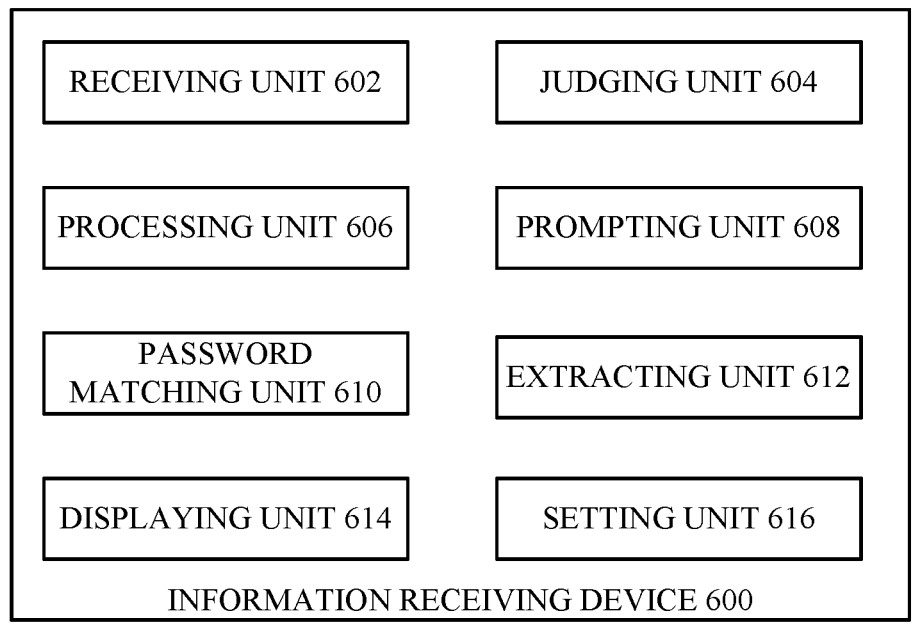
FIG. 6 shows a schematic structural diagram of an information receiving device according to an implementation of the present disclosure.

FIG. 6 shows a schematic structural diagram of an information receiving device according to an implementation of the present disclosure.

As shown in FIG. 6, an information receiving device 600 according to an implementation of the present disclosure, comprises: a receiving unit 602 for receiving a short message transmitted by the information transmitting device 500; a judging unit 604 for judging whether a backup tag or a disappear-after-reading tag is associated with the short message; and a processing unit 606 for, when the backup tag is associated with the short message, deleting the content of the short message on the basis of a close command received, after the short message is opened, and extracting the short message backed up on the server for a user to read when a command for opening the short message is received again.

In this technical solution, as the backup tag is added to the short message when the short message transmitted in the disappear-after-reading mode is backed up to the server, it is may be judged whether the short message received is a disappear-after-reading short message, by judging whether the backup tag or the disappear-after-reading tag is associated with the short message received. If the backup tag or the disappear-after-reading tag is associated with the short message received, the short message is the one transmitted in the disappear-after-reading mode. When the short message has been read and a command for closing a short message displaying interface is received, the short message is directly deleted and could not be saved, thus preventing the content of the short message from being divulged and greatly increasing the privacy for the short message.

In some implementations, if the backup tag is associated with the short message received, the short message could be viewed again by accessing the server when having been read and closed, thus avoiding the problem in prior art that the short message could not be viewed again when having been deleted, since the short message has been backed up on the server. However, if the disappear-after-reading tag is associated with the short message received, it is indicated that the short message is not backed up to the server when being transmitted, and could not be viewed again when having been read and closed.

In the above technical solution, it is preferable to further comprise: an prompting unit 608 for, before extracting the short message backed up on the server for the user to read, prompting the user to input a password corresponding to the backup short message; a password matching unit 610 for verifying whether the password is input correctly; and an extracting unit 612 for, when the password is input correctly, extracting the short message backed up on the server for the user to read.

In this technical solution, when the short message backed up on the server is extracted for the user to read, the password is verified. If the password is input correctly, the disappear-after-reading short message deleted and backed up could be viewed repeatedly; if the password is input incorrectly, the short message backed up could not be extracted, and the security of the short message on the backup server is enhanced.

In the above technical solution, preferably, the processing unit 606 is for, when the disappear-after-reading tag is associated with the short message, deleting the content of the short message on the basis of the close command received, after the short message is opened.

In this technical solution, if the disappear-after-reading tag is associated with the short message received, it is indicated that the short message is not backed up to the server when being transmitted. The short message associated with the disappear-after-reading tag is directly deleted and could not be viewed again when having been read and closed.

In the above technical solution, it is preferable to further comprise: a displaying unit 614 for displaying the received short message associated with the backup tag or the disappear-after-reading tag, wherein when the short message is not opened, the short message is displayed in a first display style; and when the short message is opened, the short message is displayed in a second display style.

In this technical solution, by displaying the short message associated with the backup tag or the disappear-after-reading tag in two display style when being opened and not opened, it is may be visually displayed whether the short message has been opened. When a plurality of short messages associated with the backup tag or the disappear-after-reading tag are received simultaneously, whether each of the plurality of short messages has been opened is judged by means of the display style, that is to say, whether the short message being deleted is judged. If the short message is displayed in the first display style, the short message is not opened and could be viewed again; if the short message is opened and a message reading interface is closed, the short message is displayed in the second display style.

When the short message is displayed in the second display style and the disappear-after-reading tag is associated with the short message, the short message including the transmitter of the short message, the transmitting time and the content of the short message and so on, could not be viewed even if it is clicked by the user, since the short message has been deleted and is not backed up to the server. However, when the short message is displayed in the second display style and the backup tag is associated with the short message, the short message could still be viewed on the server when it is clicked by the user and the password is verified as valid, for the short message has been backed up on the server although it has been deleted.

In the above technical solution, it is preferable to further comprise: a setting unit 616 for setting the first display style and/or the second display style on the basis of a setting command received.

In this technical solution, the first display style and the second display style may be set freely, and the flexibility of the display styles is enhanced. For example, the first display style may be set to be a sealed envelop style, and the second display style may be set to be an empty envelop style. Alternatively, the first display style may be set to be an envelop style with a disappear-after-reading tag, and the second display style may be set to be a torn envelop style. Naturally, there are many display styles which are not listed herein.

In some implementations, the second display style of the short message associated with the backup tag and the second display style of the short message associated with the disappear-after-reading tag may be identical, but in a more preferred implementation, the second display style of the short message associated with the backup tag and the second display style of the short message associated with the disappear-after-reading tag may be set differently, and thus whether the short message could be viewed again may be identified on the basis of the second display style of the short message, avoiding trying to view again by opening each short message.

Figure 7:
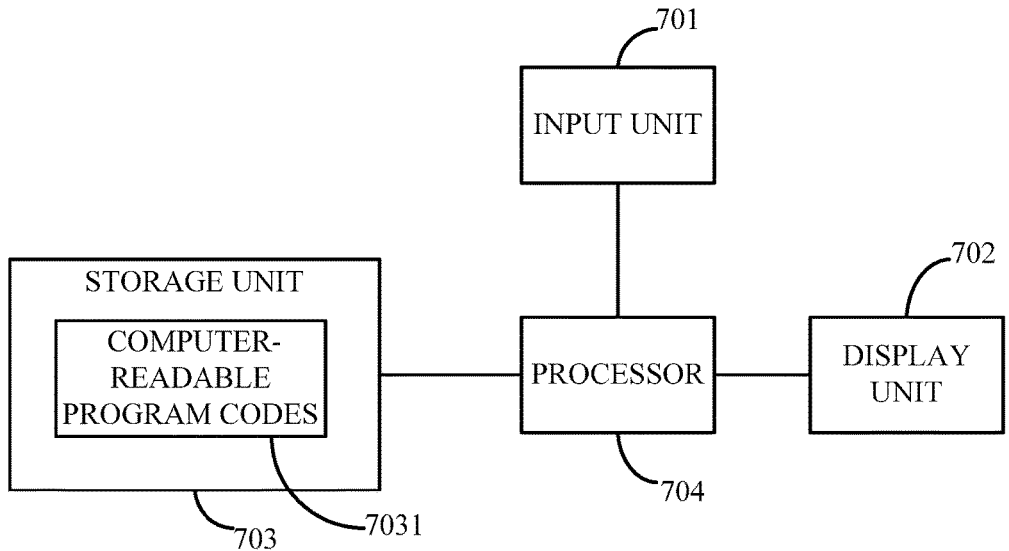
FIG. 7 shows a schematic structural diagram of an information transmitting device according to an implementation of the present disclosure.

FIG. 7 shows a schematic structural diagram of an information transmitting device according to an implementation of the present disclosure.

As shown in FIG. 7, an information transmitting device according to an implementation of the present disclosure, can include but not limited to an input unit 701, a display unit 702, a storage unit 703, and a processor 704. The input unit 701, the display unit 702, and the storage unit 703 are electrically connected to the processor 704.

The input unit 701 is configured to input information to the terminal, such as letters. The input unit 701 may be but not limited to a physical keyboard, a touchscreen, or a combination of the physical keyboard and the touchscreen.

The display unit 702 is configured to display visual information, such as text, image. The display unit 702 may be an LED display screen.

The storage unit 703 is configured to store a plurality of computer-readable program codes 7031. The storage unit 703 can be a read only memory (ROM), a random access memory (RAM), a U-disk, a removable hard disk, etc.

The processor 704 can include multiple cores for multi-thread or parallel processing. In this implementation, the processor 704 is configured to execute the plurality of computer-readable program codes 7031 to select a target transmission mode from transmission modes for a to-be-transmitted short message in response to receiving a selection command, wherein the transmission modes includes a disappear-after-reading transmission mode and a normal transmission mode; prompt a user whether to back up the to-be-transmitted short message to a server, when the target transmission mode is the disappear-after-reading transmission mode; add a backup tag to the to-be-transmitted short message and back up the to-be-transmitted short message with the backup tag to the server, when a command for backing up the to-be-transmitted short message to the server is received; and transmit the to-be-transmitted short message with the backup tag to an information receiving device when a transmission command is received, thus allowing the information receiving device to view, on the basis of the backup tag in the short message received, the short message on the server when the short message has been read and deleted.

In this implementation, before backing up the short message with the backup tag to the server, the processor 704 is configured to execute the plurality of computer-readable program codes 7031 to judge whether a password corresponding to the information transmitting device is saved on the server; and back up the short message to the server when the password corresponding to the information transmitting device has already been saved on the server, and extract the attribute information of the short message as search keywords thereof, thus allowing the information transmitting device to search for the short message on the basis of the keywords.

In this implementation, the processor 704 is configured to execute the plurality of computer-readable program codes 7031 to prompt the user to create a password when the password corresponding to the information transmitting device is not saved on the server.

In this implementation, the processor 704 is configured to execute the plurality of computer-readable program codes 7031 to add a disappear-after-reading tag to the to-be-transmitted short message when a command for not backing up the to-be-transmitted short message to the server is received, and transmit the short message in the disappear-after-reading transmission mode to the information receiving device.

In this implementation, the processor 704 is configured to execute the plurality of computer-readable program codes 7031 to transmit the to-be-transmitted short message in the normal transmission mode to the information receiving device when it is detected that the target transmission mode is the normal transmission mode.

Figure 8:
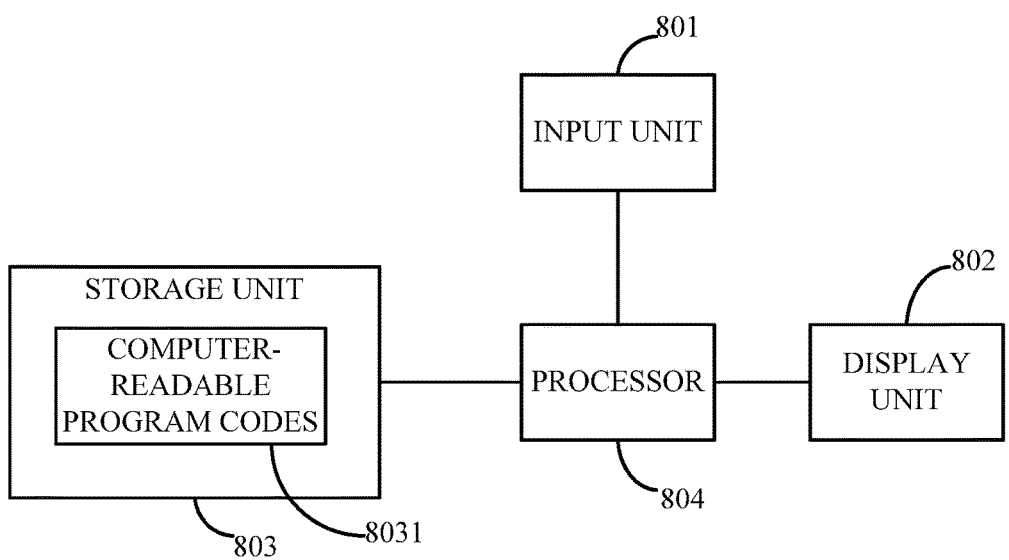
FIG. 8 shows a schematic structural diagram of an information receiving device according to an implementation of the present disclosure.

FIG. 8 shows a schematic structural diagram of an information receiving device according to an implementation of the present disclosure.

As shown in FIG. 8, an information transmitting device according to an implementation of the present disclosure, can include but not limited to an input unit 801, a display unit 802, a storage unit 803, and a processor 804. The input unit 801, the display unit 802, and the storage unit 803 are electrically connected to the processor 804.

The input unit 801 is configured to input information to the terminal, such as letters. The input unit 801 may be but not limited to a physical keyboard, a touchscreen, or a combination of the physical keyboard and the touchscreen.

The display unit 802 is configured to display visual information, such as text, image. The display unit 802 may be an LED display screen.

The storage unit 803 is configured to store a plurality of computer-readable program codes 8031. The storage unit 803 can be a read only memory (ROM), a random access memory (RAM), a U-disk, a removable hard disk, etc.

The processor 804 can include multiple cores for multi-thread or parallel processing. In this implementation, the processor 804 is configured to execute the plurality of computer-readable program codes 8031 to receive a short message transmitted by an information transmitting device; judge whether a backup tag or a disappear-after-reading tag is associated with the short message; and when the backup tag is associated with the short message, delete the content of the short message on the basis of a close command received, after the short message is opened, and extract the short message backed up on the server for a user to read when a command for opening the short message is received again.

In this implementation, before extracting the short message backed up on the server for the user to read, the processor 804 is configured to execute the plurality of computer-readable program codes 8031 to prompt the user to input a password corresponding to the backup short message, and verifying whether the password is input correctly; when the password is input correctly, extract the short message backed up on the server for the user to read.

In this implementation, the processor 804 is configured to execute the plurality of computer-readable program codes 8031 to when the disappear-after-reading tag is associated with the short message, delete the content of the short message on the basis of the close command received, after the short message is opened.

In this implementation, the processor 804 is configured to execute the plurality of computer-readable program codes 8031 to display the received short message associated with the backup tag or the disappear-after-reading tag, wherein when the short message is not opened, the short message is displayed in a first display style; and when the short message is opened, the short message is displayed in a second display style.

In this implementation, the processor 804 is configured to execute the plurality of computer-readable program codes 8031 to set the first display style and/or the second display style on the basis of a setting command received.

The technical solution of the present disclosure is detailed described in conjunction with the accompanying drawings. By means of the technical solution of the present disclosure, the short message may be directly deleted when the short message has been read by the receiver and a message reading interface is closed; when the user need to view again, the short message may be extracted again from the server to be viewed if the password is verified as valid by the server, and thus not only is the privacy for the short message increased, but repeated viewing is also allowed.

According to an implementation of the present disclosure, a program product stored in a non-volatile machine-readable medium for information transmission of a terminal is provided. The program product comprises machine-executable codes for a computer system to execute the following steps: selecting a target transmission mode from transmission modes for a to-be-transmitted short message in response to receiving a selection command, wherein the transmission modes include a disappear-after-reading transmission mode and a normal transmission mode; prompting a user whether to back up the to-be-transmitted short message to a server, when the target transmission mode is the disappear-after-reading transmission mode; adding a backup tag to the to-be-transmitted short message and backing up the to-be-transmitted short message with the backup tag to the server, when a command for backing up the to-be-transmitted short message to the server is received; and transmitting the to-be-transmitted short message with the backup tag to an information receiving device when a transmission command is received, thus allowing the information receiving device to view, on the basis of the backup tag in the short message received, the short message on the server when the short message has been read and deleted.

According to an implementation of the present disclosure, a non-volatile machine-readable medium, for storing a program product for information transmission of a terminal, is provided. The program product comprises machine-executable codes for a computer system to execute the following steps: selecting a target transmission mode from transmission modes for a to-be-transmitted short message in response to receiving a selection command, wherein the transmission modes include a disappear-after-reading transmission mode and a normal transmission mode; prompting a user whether to back up the to-be-transmitted short message to a server, when the target transmission mode is the disappear-after-reading transmission mode; adding a backup tag to the to-be-transmitted short message and backing up the to-be-transmitted short message with the backup tag to the server, when a command for backing up the to-be-transmitted short message to the server is received; and transmitting the to-be-transmitted short message with the backup tag to an information receiving device when a transmission command is received, thus allowing the information receiving device to view, on the basis of the backup tag in the short message received, the short message on the server when the short message has been read and deleted.

According to an implementation of the present disclosure, a machine-readable program for a machine to execute the information transmitting method according to any one of the above technical solutions is provided.

According to an implementation of the present disclosure, a storage medium, for storing a machine-readable program for a machine to execute the information transmitting method according to any one of the above technical solutions, is provided.

According to an implementation of the present disclosure, a program product stored in a non-volatile machine-readable medium for information reception of a terminal is provided. The program product comprises machine-executable codes for a computer system to execute the following steps: receiving a short message transmitted by an information transmitting device; judging whether a backup tag or a disappear-after-reading tag is associated with the short message; and, when the backup tag is associated with the short message, deleting the content of the short message on the basis of a close command received, after the short message is opened, and extracting the short message backed up on the server for a user to read when a command for opening the short message is received again.

According to an implementation of the present disclosure, a non-volatile machine-readable medium, for storing a program product for information reception of a terminal, is provided. The program product comprises machine-executable codes for a computer system to execute the following steps: receiving a short message transmitted by an information transmitting device; judging whether a backup tag or a disappear-after-reading tag is associated with the short message; and, when the backup tag is associated with the short message, deleting the content of the short message on the basis of a close command received, after the short message is opened, and extracting the short message backed up on the server for a user to read when a command for opening the short message is received again.

According to an implementation of the present disclosure, a machine-readable program for a machine to execute the information receiving method according to any one of the above technical solutions is provided.

According to an implementation of the present disclosure, a storage medium, for storing a machine-readable program for a machine to execute the method of any one of the above technical solutions, is provided.

The foregoing is only some of the preferred embodiments or implementations of the present disclosure, and is not for limiting the present disclosure. For persons skilled in the art, the present disclosure could have various modifications and variations. Any amendment, equivalent, or improvement etc. within the spirit and principle of the present disclosure should be included within the protection scope of the present disclosure While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for increasing privacy of transmitted information, comprising:
    selecting, by a user at an information transmitting device,
        a target transmission mode from transmission modes
        for a to-be-transmitted short message,
        the transmission modes include a disappear-after-reading transmission mode and a normal transmission mode,
        the disappear-after-reading transmission mode indicates that the to-be-transmitted short message
            is to be deleted, from a receiving device, once viewed, and
            cannot be saved at the receiving device;
    on a condition that the target transmission mode is the disappear-after-reading transmission mode, prompting the user whether to back up the to-be-transmitted short message to a backup server;
    in response to receiving from the user a command to back up the to-be-transmitted short message to the server:
        adding, by the information transmitting device, a backup tag to the to-be-transmitted short message, the backup tag indicating that the to-be-transmitted short message
            is to be deleted, from the receiving device, once viewed,
            cannot be saved at the receiving device, and
            is subsequently viewable from a server; and
        backing up the to-be-transmitted short message to the server; and
    in response to receiving, from the user, a transmission command, transmitting, by the information transmitting device, the to-be-transmitted short message to an information receiving device.

2. The method of claim 1, wherein backing up the to-be-transmitted short message with the backup tag to the server comprises:
    determining whether a password corresponding to the information transmitting device is saved on the server; and
    backing up the to-be-transmitted short message to the server when the password corresponding to the information transmitting device has already been saved on the server, and extracting attribute information of the to-be-transmitted short message as search keywords to enable the information receiving device to search for the to-be-transmitted short message based on the search keywords.

3. The method of claim 1, further comprising:
prompting the user to create a password when the password corresponding to the information transmitting device is not saved on the server.

4. The method of claim 1, further comprising:
adding a disappear-after-reading tag to the to-be-transmitted short message when a command for not backing up the to-be-transmitted short message to the server is received, and transmitting the to-be-transmitted short message in the disappear-after-reading transmission mode to the information receiving device.

5. The method of claim 1, further comprising:
transmitting the to-be-transmitted short message in the normal transmission mode to the information receiving device when it is detected that the target transmission mode is the normal transmission mode.

6. A method for increasing privacy of information received at an information receiving device, comprising:
receiving, by the information receiving device, a short message transmitted by an information transmitting device, the short message comprising content and a tag, the tag selected from a set comprising a disappear-after-reading tag and a backup tag,
the disappear-after-reading tag indicating that the short message
is to be deleted, from the information receiving device, once opened, and
cannot be saved at the information receiving device, and
the backup tag indicating that the short message
is to be deleted, from the information receiving device, once opened,
cannot be saved at the information receiving device, and
is subsequently viewable from a server;
opening, by a user, the short message;
in response to the user closing the short message and the short message comprising the backup tag:
deleting the content of the short message; and
in response to the user re-opening the short message, extracting the short message backed up on the server for the user to read.

7. The method of claim 6, wherein extracting the short message backed up on the server for the user to read further comprises:
prompting the user to input a password corresponding to the backup short message, and verifying whether the password is input correctly; and
when the password is input correctly, extracting the short message backed up on the server for the user to read.

8. The method of claim 6, further comprising:
in response to the user closing the short message and the short message comprising the disappear-after-reading tag, deleting the content of the short message from the information receiving device.

9. The method of claim 6, further comprising:
displaying the received short message associated with the backup tag or the disappear-after-reading tag, wherein:
when the short message is not opened, the short message is displayed in a first display style; and
when the short message is opened, the short message is displayed in a second display style.

10. The method of claim 9, further comprising
setting at least one of the first display style and the second display style in response to receiving a setting command.

11. An apparatus for increasing privacy of transmitted information, comprising:
a storage unit storing a plurality of computer-readable program codes; and
a processor electrically connected to the storage unit and configured to execute the plurality of computer-readable program codes to:
select, by a user, a target transmission mode from transmission modes for a to-be-transmitted short message,
the transmission modes include a disappear-after-reading transmission mode and a normal transmission mode
the disappear-after-reading transmission mode indicates that the to-be-transmitted short message
is to be deleted, from a receiving device, once viewed, and
cannot be saved at the receiving device;
on a condition that the target transmission mode is the disappear-after-reading transmission mode:
prompt the user whether to back up the to-be-transmitted short message to a backup server;
in response to receiving from the user a command to back up the to-be-transmitted short message to the server:
add a backup tag to the to-be-transmitted short message, the backup tag indicating that the to-be-transmitted short message
is to be deleted, from the receiving device, once viewed,
cannot be saved at the receiving device, and
is subsequently viewable from a server; and
back up the to-be-transmitted short message to the server; and
transmit the to-be-transmitted short message to an information receiving device.

12. The apparatus of claim 11, wherein the plurality of computer-readable program codes to back up the to-be-transmitted short message with the backup tag to the server further comprise computer-readable program codes to:
determine whether a password corresponding to the apparatus is saved on the server; and
back up the to-be-transmitted short message to the server when the password corresponding to the apparatus has already been saved on the server, and extract attribute information of the to-be-transmitted short message as search keywords to enable the information receiving device to search for the to-be-transmitted short message based on the search keywords.

13. The apparatus of claim 11, wherein the processor is further configured to execute the plurality of computer-readable program codes to:
prompt the user to create a password when the password corresponding to the apparatus is not saved on the server.

14. The apparatus of claim 11, wherein the processor is further configured to execute the plurality of computer-readable program codes to:
add a disappear-after-reading tag to the to-be-transmitted short message when a command for not backing up the to-be-transmitted short message to the server is received, and transmit the to-be-transmitted short message in the disappear-after-reading transmission mode to the information receiving device.

15. The apparatus of claim 11, wherein the processor is further configured to execute the plurality of computer-readable program codes to:

transmit the to-be-transmitted short message in the normal transmission mode to the information receiving device based on a determination that the target transmission mode is the normal transmission mode.

16. An apparatus for increasing privacy of received information, comprising:
a storage unit storing a plurality of computer-readable program codes; and
a processor electrically connected to the storage unit and configured to execute the plurality of computer-readable program codes to:
receive a short message transmitted by an information transmitting device, the short message comprising content and a tag,
the tag selected from a set comprising a disappear-after-reading tag and a backup tag,
the disappear-after-reading tag indicating that the short message
is to be deleted, from the apparatus, once opened, and
cannot be saved at the apparatus, and
the backup tag indicating that the short message
is to be deleted, from the apparatus, once opened, cannot be saved at the apparatus, and
is subsequently viewable from a server;
open the short message in response to a first open command received from a user;
in response to receiving a close command from the user,
determine whether the backup tag or the disappear-after-reading tag is associated with the short message; and
when the backup tag is associated with the short message:
delete the content of the short message; and
in response to a second open command received from the user, extract the short message backed up on the server for the user to read.

17. The apparatus of claim 16, wherein the plurality of computer-readable program codes to extract the short message backed up on the server for the user to read further comprise computer-readable program codes to:
prompt the user to input a password corresponding to the short message backed up on the server, and verify whether the password is input correctly; and
based on a determination that the password is input correctly, extract the short message backed up on the server for the user to read.

18. The apparatus of claim 16, wherein the processor is further configured to execute the plurality of computer-readable program codes to:
when the disappear-after-reading tag is associated with the short message, delete the content of the short message in response to receiving the close command after the short message is opened.

19. The apparatus of claim 16, wherein the processor is further configured to execute the plurality of computer-readable program codes to:
display the received short message associated with the backup tag or the disappear-after-reading tag, wherein:
when the short message is not opened, the short message is displayed in a first display style; and
when the short message is opened, the short message is displayed in a second display style.

20. The apparatus of claim 19, wherein the processor is further configured to execute the plurality of computer-readable program codes to:
set at least one of the first display style and the second display style in response to receiving a setting command.

* * * * *